US009129393B2

(12) United States Patent
Bosco et al.

(10) Patent No.: US 9,129,393 B2
(45) Date of Patent: Sep. 8, 2015

(54) IMAGE CHROMA NOISE REDUCTION IN THE BAYER DOMAIN

(75) Inventors: Angelo Bosco, Giarre (IT); Davide Giacalone, Gela (IT); Arcangelo Ranieri Bruna, San Pietro Clarenza (IT)

(73) Assignee: STMircoelectronics S.r.l., Agrate Brianza (IT)

( * ) Notice: Subject to any disclaimer, the term of this patent is extended or adjusted under 35 U.S.C. 154(b) by 263 days.

(21) Appl. No.: 13/421,799

(22) Filed: Mar. 15, 2012

(65) Prior Publication Data

US 2012/0237124 A1 Sep. 20, 2012

(30) Foreign Application Priority Data

Mar. 15, 2011 (IT) ................................ VI2011A0052

(51) Int. Cl.

| | |
|---|---|
| ***G06K 9/00*** | (2006.01) |
| ***G06K 9/34*** | (2006.01) |
| ***G06K 9/36*** | (2006.01) |
| ***G06T 5/20*** | (2006.01) |
| ***G06T 3/40*** | (2006.01) |

(52) U.S. Cl.

CPC ................. *G06T 5/20* (2013.01); *G06T 3/4015* (2013.01)

(58) Field of Classification Search

USPC .................................................. 382/162–167

See application file for complete search history.

(56) References Cited

U.S. PATENT DOCUMENTS 3,778,543 A * 12/1973 Lowry .......................... 348/628
5,920,356 A * 7/1999 Gupta et al. .................. 348/606
6,445,818 B1 * 9/2002 Kim et al. ..................... 382/165
6,621,937 B1 * 9/2003 Adams et al. ................. 382/275
6,980,326 B2 12/2005 Tsuchiya et al.
6,990,249 B2 * 1/2006 Nomura ........................ 382/254
7,084,906 B2 8/2006 Adams, Jr. et al.
7,511,769 B2 * 3/2009 Renner et al. ................. 348/627
7,529,405 B2 5/2009 Masuno et al.
8,014,627 B2 9/2011 Guan (Continued)

FOREIGN PATENT DOCUMENTS

EP 1 093 087 A2 4/2001
EP 1289309 3/2003

(Continued)

OTHER PUBLICATIONS

Search Report for Italian Application No. VI20110052, Ministero dello Sviluppo Economico, Munich, Jan. 16, 2012, pp. 7.

(Continued)

*Primary Examiner* — Alex Liew
(74) *Attorney, Agent, or Firm* — Seed IP Law Group PLLC

(57) ABSTRACT

An embodiment relates to a method and an image processor for reducing chroma noise in digital-image data. An embodiment performs noise reduction in the color-filter-array domain prior to demosaicing in order to prevent spreading of noise in subsequent stages of the image-processing pipeline. Peaks in the CFA data are attenuated in order to prevent any undesired color cast. Specifically, any correction to a certain pixel is made in accordance with the amplitude of digital gains applied, as well as with the local luminance and the contribution of the current color channel to the local luminance. In this manner, corrections are restricted to image areas that are subject to high digital amplification, that are comparatively dark, and that are not dominated by the current color channel.

17 Claims, 10 Drawing Sheets

(56) References Cited

U.S. PATENT DOCUMENTS

| | | | | |
|---|---|---|---|---|
| 8,520,969 | B2 | 8/2013 | Tomaselli et al. | |
| 2002/0037101 | A1 * | 3/2002 | Aihara | 382/167 |
| 2004/0001230 | A1 * | 1/2004 | Kagawa | 358/2.1 |
| 2006/0017855 | A1 | 1/2006 | Yamada | |
| 2006/0232709 | A1 * | 10/2006 | Renner et al. | 348/607 |
| 2007/0153341 | A1 | 7/2007 | Kang | |
| 2008/0292209 | A1 | 11/2008 | Vakrat | |
| 2010/0027886 | A1 | 2/2010 | Kang et al. | |
| 2010/0141809 | A1 | 6/2010 | Fukutomi | |
| 2010/0309344 | A1 * | 12/2010 | Zimmer et al. | 348/242 |
| 2010/0309345 | A1 * | 12/2010 | Zimmer et al. | 348/242 |
| 2012/0194719 | A1 | 8/2012 | Churchwell et al. | |
| 2012/0237124 | A1 * | 9/2012 | Bosco et al. | 382/167 |
| 2013/0064448 | A1 | 3/2013 | Tomaselli et al. | |

FOREIGN PATENT DOCUMENTS

| | | | |
|---|---|---|---|
| JP | 2006-14261 | A | 1/2006 |
| WO | 03/051035 | A1 | 6/2003 |

OTHER PUBLICATIONS

Angelo Bosco, Sebastiano Battiato, Arcangelo Bruna, and Rosetta Rizzo, "Texture Sensitive Denoising for Single Sensor Color Imaging Devices", Computational Color Imaging, Springer Berlin Heidelberg. Berlin, Heidelberg. vol. 5646, Mar. 6, 2009 (2089-83-86), pp. 130-139, XP019125010.

tAngelo Bosco. Massimo Mancuso, Sebastiano Battiato and Giuseppe Spampinato: "Adaptive Temporal Filtering for CFA Video Sequences". Proceedings of ACIVS (Advanced Concepts for Intelligent Vision Systems), Ghent, Belgium, Sep. 9-11, 2002. pp. 19-24. XP008038518.

Tomaselli et al.,"False colors removal on the YCrCb color space," Jan. 20, 2009, pp. 72500C-1-72500C-10, SPIE-IS&T, vol. 7250.

Tomasi et al., "Bilateral Filtering for Gray and Color Images," Proceedings of the International Conference on Computer Vision, 1998, pp. 839-846.

Zhang et al., "Multiresolution bilateral filtering for image denoising," *IEEE Transactions on Image Processing 17*(12):2324-2333, Dec. 2008.

* cited by examiner

IMAGE CHROMA NOISE REDUCTION IN THE BAYER DOMAIN

PRIORITY CLAIM

The instant application claims priority to Italian Patent Application No. VI2011A000052, filed Mar. 15, 2011, which application is incorporated herein by reference in its entirety.

TECHNICAL FIELD

An embodiment relates to digital image processing, in particular to a method for reducing chroma noise in digital image data and a corresponding image processor.

BACKGROUND

Image sensors in digital cameras, camcorders, and scanners are usually covered by a filter layer such that each pixel is sensitive to one color component only; for example, either red, green or blue. An example of such a filter arrangement is illustrated in FIG. 1, which shows a block of nine by nine pixels, each of which being associated with one of the red color channel (R), the green color channel (G), and the blue color channel (B). The arrangement of color filters shown in FIG. 1 is commonly known as a Bayer filter.

The raw data delivered by such an image sensor includes a plurality of pixels, wherein each pixel is associated with a single color channel, in accordance with the particular color filter mosaic employed. A substantial amount of processing is required for converting the raw image data to color image data, i.e., to assign a full RGB or YCbCr color value to each pixel. This processing may also be referred to as converting the image information from the CFA (Color Filter Array) domain to the multi-component-per-pixel domain, such as to the RGB (Red/Green/Blue) domain or to the YCbCr (luminance and blue/red color difference) domain. One of the major steps in this process is color interpolation, or demosaicing.

FIG. 2 is a schematic illustration of a conventional image processing pipeline, including steps for CFA pre-processing such as correcting defective sensor pixels and reducing Gaussian noise (S10), steps for applying digital gains (S20) such as antivignette and white-balance correction, steps for CFA post-processing (S40) and color interpolation (S50).

Under low-light conditions, the signal delivered by the sensor generally needs to be amplified by means of analog and digital gains. Analog gains are applied at the sensor level, whereas digital gains are applied in the digital domain by using appropriate multipliers that modify the signal in the digital domain.

The image-processing pipeline includes various blocks in which multipliers are applied to the input signal in order to perform some specific task. For example, one of the blocks of an imaging pipeline aimed at photographic quality is represented by the white balance block (S20) that is in charge of correctly balancing the color channels such that the final image looks correct in terms of colors and white-point representation, removing unwanted color casts. Another amplifier block using multiplications is the antivignette (S20) that corrects the light fall-off caused by the lens, especially in the peripheral areas of the image. The above two blocks usually work in the CFA domain. In terms of multiplications, the main difference between the two blocks is that white balance applies global digital gains whereas antivignette applies spatially varying digital gains. The color matrixing block is another pipeline element contributing with multiplications; however, this block is positioned after demosaicing and it is not taken into account in the following description for brevity.

Chroma noise usually appears in low-light conditions and manifests as colored blobs that are particularly evident in shadow areas where the signal-to-noise ratio can be extremely low. Existing solutions usually address the problem of chroma noise at the end of the pipeline, typically in the RGB domain or, better, in the YCbCr domain, allowing proper separation of luminance information from chrominance. In general, large kernels are required because of the low-frequency nature of the chroma blobs.

When reducing chroma noise in the YCbCr domain, the image has already undergone a substantial amount of processing. Gaussian noise reduction, antivignette, white balance, and color interpolation are among some of the algorithms that have already been applied before chroma-noise reduction takes place. Some of the aforementioned algorithms have low-pass effects, and others perform signal amplification either globally, locally, adaptively, or selectively. This yields an image in which the chroma noise has been amplified and undergone low-pass filtering. The result of this processing usually results in color blobs having low frequency that spread across many pixels of the image array. To effectively reduce the residual low-frequency noise, a conventional technique uses large kernels, possibly in combination with subsampling techniques. Domain changes, such as filtering in the wavelet domain are also viable. Each of these techniques, however, is rather complex both in terms of hardware and software implementation, and the results obtained still leave room for improvement.

SUMMARY

An embodiment is a more efficient method and image processor for reducing chroma noise in digital image data.

It is the particular approach of an embodiment to address the problem of chroma-noise reduction in the early stages of the image-processing pipeline, i.e., to perform chroma-noise reduction in the CFA domain. In this manner, chroma noise may be reduced before it is amplified and spread by the low-pass filters (e.g. Gaussian noise reducer), or before it is even further amplified (e.g. by color matrixing). Moreover, an embodiment of a method for chroma-noise reduction does not require large filter kernels and, therefore, can be implemented in a particularly efficient manner.

According to an embodiment, a method for reducing chroma noise in digital-image data is provided. The method includes the steps of receiving raw image data of a block of pixels, each pixel being associated with either one of at least three different color channels; computing, for each color channel, a mean value of the pixels of the block of pixels that are associated with the color channel; and replacing an original value of a central pixel of the block of pixels with a correction value smaller than the original value, if the original value is substantially larger than each of the mean values computed for the at least two color channels other than the color channel of the central pixel, and if the mean value computed for the color channel of the central pixel is not substantially larger than each of the mean values computed for the other color channels.

According to an embodiment, an image processor for reducing chroma noise in digital-image data is provided. The image processor includes a submask-means computation unit for receiving raw image data of a block of pixels, each pixel being associated with either one of at least three different color channels, and for computing, for each color channel, a mean value of the pixels of the block of pixels that are associated with the color channel; and a correction block for replacing an original value of a central pixel of the block of pixels with a correction value smaller than the original value, if the original value is substantially larger than each of the mean values computed for the at least two color channels other than the color channel of the central pixel, and if the mean value computed for the color channel of the central pixel is not substantially larger than each of the mean values computed for the other color channels.

According to an embodiment, a digital camera with an image processor according to an embodiment is provided.

In an embodiment, a digital gain by which the central pixel has been scaled in order to compensate at least one of vignetting and white balance is received and the original value is replaced with the correction value only if the digital gain exceeds a predefined threshold value. In this manner, any corrections to the CFA data may be restricted to image areas that are subject to high digital amplification.

In an embodiment, a weighted sum of the mean values computed for each of the three color channels is computed and the original value is replaced with the correction value only if the weighted sum does not exceed a predefined threshold value. In this manner, any corrections to the CFA data may be restricted to particularly dark image areas.

In an embodiment, the original value is replaced with the correction value only if the mean value computed for the color channel of the central pixel does not exceed a predefined threshold value. In this manner, any corrections to the CFA data may be restricted to image areas in which the current color channel is not the predominant color.

According to an embodiment, the correction value is computed so that a difference between the value of the central pixel and a maximum of the mean values computed for the other color channels is reduced. Therefore, peaks in the CFA data may be attenuated.

In an embodiment, a digital gain by which the central pixel has been scaled in order to compensate at least one of vignetting and white balance is received and a pre-correction value is obtained by computing a difference between the original value of the central pixel and a maximum of the mean values computed for the other color channels, scaling said difference by a non-negative damping factor less than or equal to one, and adding the scaled difference to said maximum, the damping factor being a decreasing function of the digital gain. The correction value may then be computed as a weighted sum of the pre-correction value and the original value of the central pixel. In this manner, the amplitude of the correction may be adapted to the amplitude of the digital amplification.

Further, according to an embodiment, a non-negative fading coefficient less than or equal to one may be received, so that the correction value may be computed by scaling the pre-correction value with the fading coefficient, scaling the original value of the central pixel with one minus the fading coefficient, and adding the scaled pre-correction value and the scaled original value.

In an embodiment, a weighted sum of the mean values computed for each of the three color channels is computed and the fading coefficient is obtained as a decreasing function of the weighted sum of the mean values. Hence, the amount of correction may be adapted to the overall signal amount within the current block.

In an embodiment, the fading coefficient is obtained as a product of a decreasing function of the weighted sum of the mean values and a decreasing function of the mean value computed for the color channel of the central pixel. In this manner, the amount of correction may be adapted to the overall signal amount within the current block and the specific contribution of the current color channel to the overall signal amount.

In an embodiment, the weighted sum of the mean values may be computed so as to correspond to the mean luminance of the block of pixels. The corrections may thus be restricted to those areas of the image that are perceived as being particularly dark.

BRIEF DESCRIPTION OF THE DRAWINGS

The above and other features and advantages of one or more embodiments will become more apparent from the following non-limiting description, given in conjunction with the accompanying drawings, in which.

DETAILED DESCRIPTION

The present disclosure is based on an in-depth understanding of the origins of chroma noise and the factors that contribute to its amplification. It has been observed that in dark images, white-balance digital gains are typically numbers such as digitalGainRed≈1, digitalGainGreen≈1.4, and digitalGainBlue≈3. Clearly this is just an example, these numbers can vary significantly, but a common trend is that one of the gains is usually much higher than the others; furthermore, in many low-light situations, the blue channel is typically the one that has the highest associated digital gain.

Figure 1:
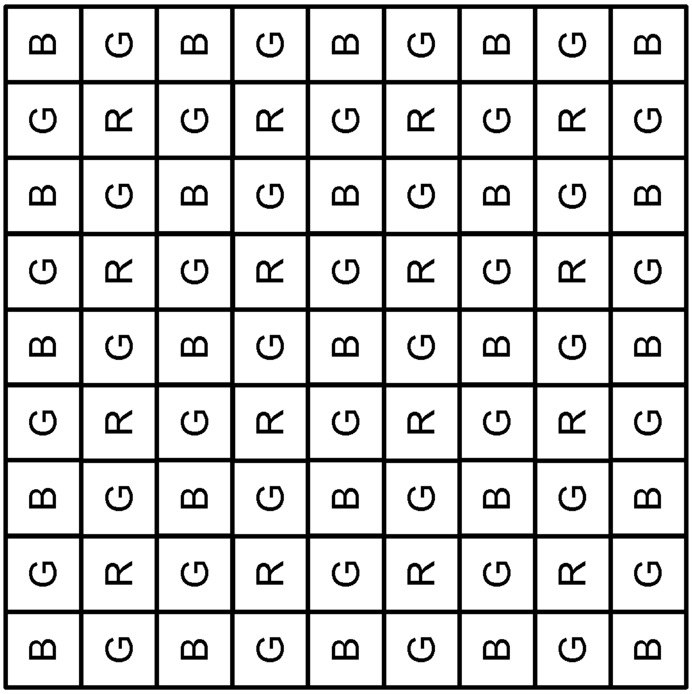
FIG. 1 illustrates an example of a color-filter arrangement for a digital image sensor.
Figure 2:
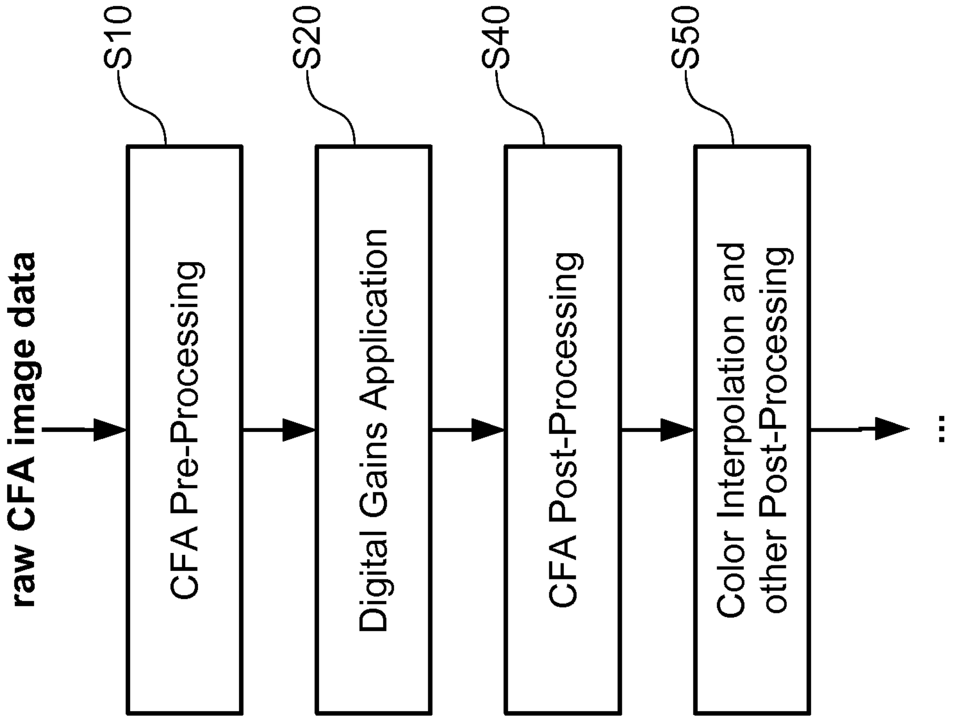
FIG. 2 illustrates part of a conventional imaging pipeline.

Some of the stages of a conventional imaging pipeline are illustrated in FIG. 2, which shows that there are may be at least four algorithms in the raw CFA domain before color interpolation, two of which may have a great impact in signal-and-noise amplification, specifically antivignette and white balance.

White balance (WB) digital gains are used to restore the correct balance between the R,G,B channels so that the white point is correctly represented in the image. White balance is a global process, in the sense that it affects each channel globally, and typically entails multiplications by factors >=1. These multiplications restore the correct channel balancing, but may also amplify noise along with useful signal.

Similar considerations are also valid for antivignette (AV). The antivignette block performs signal amplification in order to correct for the light fall-off caused by the lens positioned over the sensor.

Antivignette gains are not global; they are applied on a per-pixel basis and with different intensities according to the CFA channel and the distance of the current pixel from the AV-center of the image. Note that the AV-center usually does not correspond to the center of the image, for example because the lens center may not coincide with the center of the sensor.

The darker the area, the lower the signal, and the higher the probability that a multiplicative digital gain allows noise to significantly overpower the useful signal. A main idea behind an embodiment of a chroma-noise-reduction technique is to smooth the high-gain signal in deep and near-deep shadow areas. The correction may not be trivial because false colors are likely to manifest when an amplified signal is corrected.

An embodiment of a system needs the following information:

- Amplified input image (i.e. the raw CFA image to which the digital gains have already been applied),
- the WB digital gains for each channel (red, green, blue),
- the map of or the law for generating the spatially variant digital gains of AV, and
- the map of or the law for generating other digital gains used by other algorithms performed before demosaicing.

An adaptive correction is performed using a 9×9 kernel taking into account all CFA channels.

The following explanation will be based on the blue channel only, it being understood that the correction for green and red cases may be derived by similarity with the blue case, and this correction is formally described after the explanation of the blue case.

Figure 3:
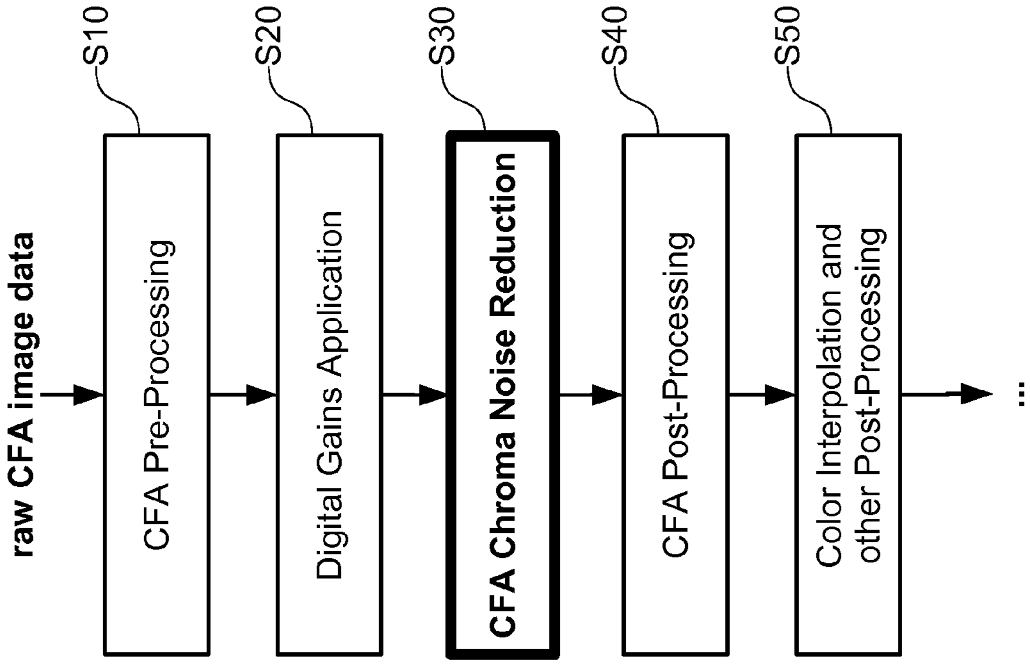
FIG. 3 is a schematic illustration of an imaging pipeline according to an embodiment.

A major concept to keep in mind is that an embodiment works on raw CFA images in which digital gains (both global and spatially variant) have already been applied. Hence, an embodiment for chroma-noise reduction is situated after the application of digital gains and before color interpolation. An example of an imaging pipeline according to an embodiment is illustrated in FIG. 3, which is similar to FIG. 2, except that it contains the additional CFA chroma-noise-reduction block S30, which will be explained in greater detail herebelow.

The application of digital gains, as described above, amplifies both the signal and the noise. In particular, deep and near-deep shadow areas contain very little amount of signal that has been amplified by, at least, WB and AV gains. In these areas, noise may overpower the signal by a large amount, thus creating large areas of dark noise. These dark areas contain noise peaks that generate, later in the pipeline, the unwanted chroma noise. An embodiment aims at reducing the dark noise after it has been amplified by the digital gains in order to block its spreading in the pipeline.

Mentioned is the fact that even when a noise-reduction algorithm is applied in the CFA domain, the noisy peaks of the signal in the dark areas are typically not large enough to be detected and removed as defects by a defect-correction algorithm. The application of the digital gains (global and spatial) creates different patterns of signal depending on the values of the digital gains. This means that the same processing mask may or may not generate chroma noise depending on the digital gains. A small peak in the signal may be strongly amplified or left untouched depending on the digital gains, hence the decision whether the peak value has to be corrected or not typically cannot be made before knowing the digital gains that will be applied.

Referring now to FIGS. 4 to 7, the general concept of chroma-noise reduction in the CFA domain will be explained according to an embodiment. An embodiment of an algorithm operates on a block of 9×9 CFA pixels. Embodiments, however, are not restricted to this particular block size, and smaller or larger blocks may be employed without deviating from the scope of the present disclosure. The following explanation will focus on the case where the central pixel of the 9×9-block is blue. Chroma-noise reduction for blocks with central pixels in red or green may be performed in an analogous manner.

Figure 4A:
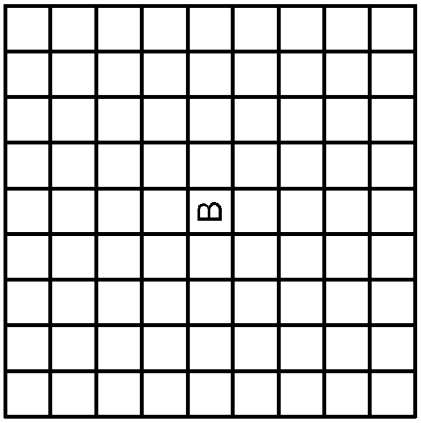
FIG. 4 is an illustration of the CFA pixels involved in a method for chroma-noise reduction according to an embodiment.
Figure 4B:
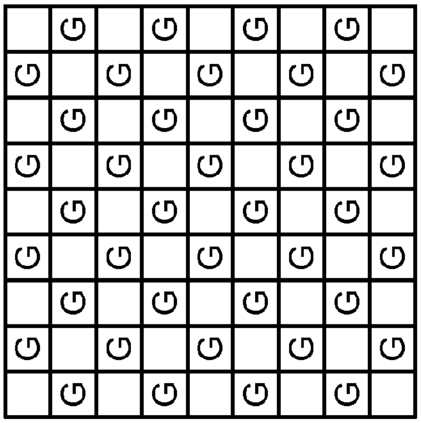
Figure 4C:
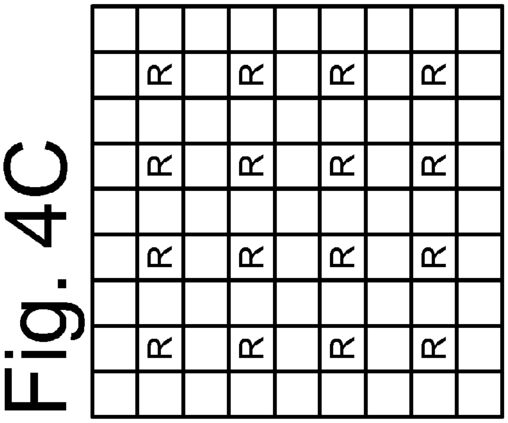

FIGS. 4A-4C illustrate an exemplary block of 9×9 CFA pixels, which serve as an input to the chroma-noise reduction algorithm. FIG. 4A indicates that the central pixel is blue. FIGS. 4B and 4C illustrate the rest of the pixels, namely green pixels and red pixels, respectively.

In a first check it is determined whether the central pixel in FIG. 4A overpowers the mean of the two other CFA channels, i.e., the green CFA pixels and the red CFA pixels. This may be achieved by computing the mean of all green CFA pixels within the current block (meanG) and the mean of all red CFA pixels within the current block (meanR). It may then be determined whether the value of the central pixel overpowers both meanG and meanR. In this context, "overpowering" means "substantially larger than", i.e., the difference being larger than a certain minimum difference. The minimum difference may either be predefined or determined on the basis of pixel statistics, such as the variance of the pixel values within the current block.

If the central pixel is found to overpower meanG and meanR, then the 9×9 block may have a blue peak that needs to be reduced. It is noted that this check compares the value of the central pixel with the means of the other channels. Moreover, this check is aimed at providing just a hint about a possible necessity of correction. There is at least one further check to determine whether there is indeed a blue peak to be corrected or not.

Referring now to FIGS. 5 and 6, a second check for effectively determining whether there is an overpowering blue peak or not is explained. According to an embodiment, it is verified, within a certain degree of confidence, whether the current area is really blue or not. If it is really blue, then either no correction should occur, or the correction should have no visible result and no significant side effects.

The present explanation is focused on blue because the example is centered on a blue pixel. If the central pixel is green or red, an analogous discussion applies by substituting red or green for blue and the other entities accordingly.

As stated above, a correction is performed only if the blue channel is not the absolutely dominant channel, i.e., if the first check finds a blue peak in the central pixel but the area is effectively blue (i.e. blue is the absolutely dominant channel) then a correction is not applied.

Blue is considered absolutely dominant if its mean value is greater than the mean values of the other two channels and the difference is very high, i.e., if the mean of all blue CFA pixels within the current block (meanB) is substantially larger the mean of the red CFA pixels and the mean of the green CFA pixels. This condition may be formally expressed as ((meanB−meanR)>meanCorrectionThBlue) & ((meanB−meanG)>meanCorrectionThBlue). Here, meanCorrectionThBlue is a (non-negative) parameter which determines the threshold at which the mean of the blue pixels is considered to be substantially larger than the mean of the red and the green pixels.

Figure 5B:
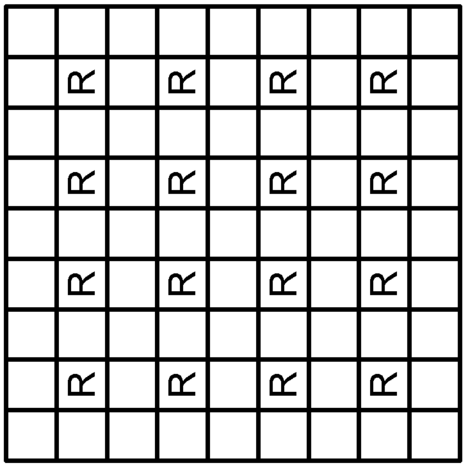
FIG. 5 is a further illustration of the CFA pixels involved in a method for chroma-noise reduction according to an embodiment.
Figure 5A:
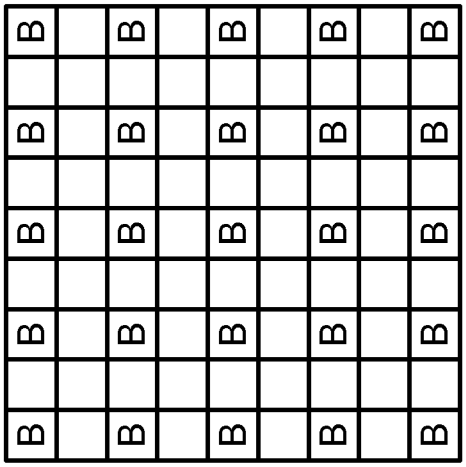
Figure 6B:
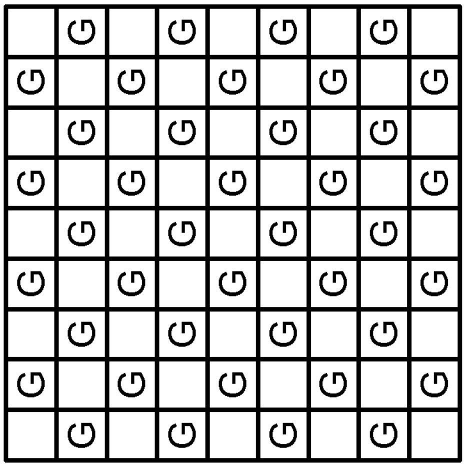
FIG. 6 is a further illustration of the CFA pixels involved in a method for chroma-noise reduction according to an embodiment.
Figure 6A:
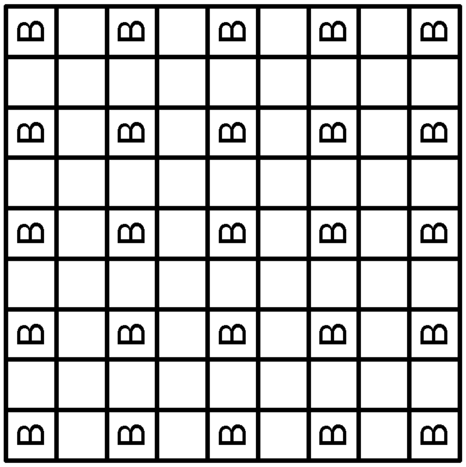

The kernels used for performing the second check are illustrated in FIGS. 5A and 5B (blue versus red) and FIGS. 6A and 6B (blue versus green).

If the second check fails, i.e., if blue is not the absolutely dominant color channel, then a correction may take place. Further details of the correction will be described below.

For the sake of completeness, the cases for the central pixel being red and green will be briefly explained. If the central pixel is red, then the above expression becomes ((meanR−meanB)>meanCorrectionThRed) & ((meanR−meanG)>meanCorrectionThRed). If the central pixel is green, then the above expression becomes ((meanG−meanR)>meanCorrectionThGreen) & ((meanG−meanB)>meanCorrectionThGreen). Here, meanCorrectionThRed and meanCorrectionThGreen are (non-negative) parameters which determine the threshold at which the mean of the red and the green pixels is considered to be substantially larger than the mean of the other pixels.

These thresholds may change according to the image bit depth. In an embodiment, the thresholds are programmable so that the user may adapt them to the specific image-sensor tuning. For an image bit depth of 10 bits per pixel, an example value of these thresholds is 900, i.e., meanCorrectionThBlue=meanCorrectionThRed=mean CorrectionThGreen=900.

Figure 7A:
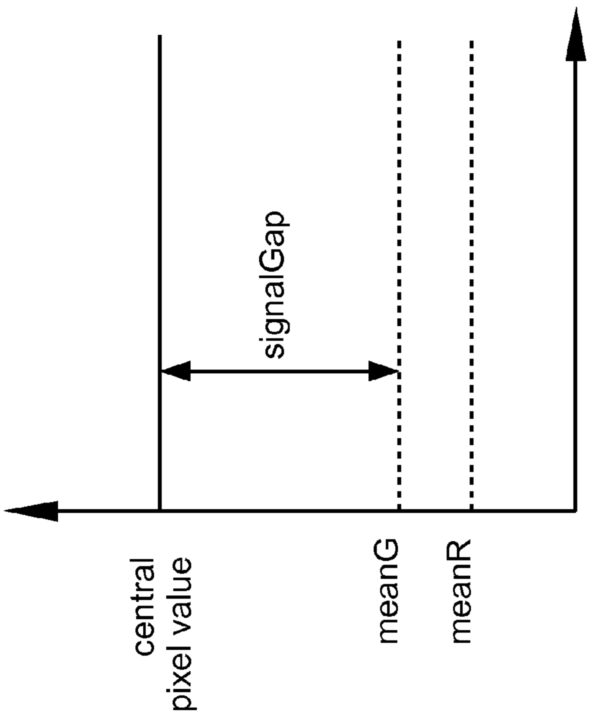
FIG. 7 is an illustration of a method for chroma-noise reduction according to an embodiment.

Referring now to FIG. 7A, computation of a pre-corrected pixel value is explained. The final correction value for the central pixel will then be computed on the basis of the pre-corrected value, as explained below.

As mentioned above, in an embodiment, the correction of the central pixel is applied only if the central pixel overpowers the means of the other channels and if it does not belong to the absolutely dominant channel. In a first step, the distance (signalGap) between the value (pixvalB) of the central pixel and the maximum of the means of the other two channels is computed, $$signalGap=pixval B-\max(mean G, mean R).$$

The equations for red and green central pixels are similar, i.e., $$signalGap=pixval R-\max(mean G, mean B),$$

$$signalGap=pixval G-\max(mean B, mean R).$$

Figure 7B:
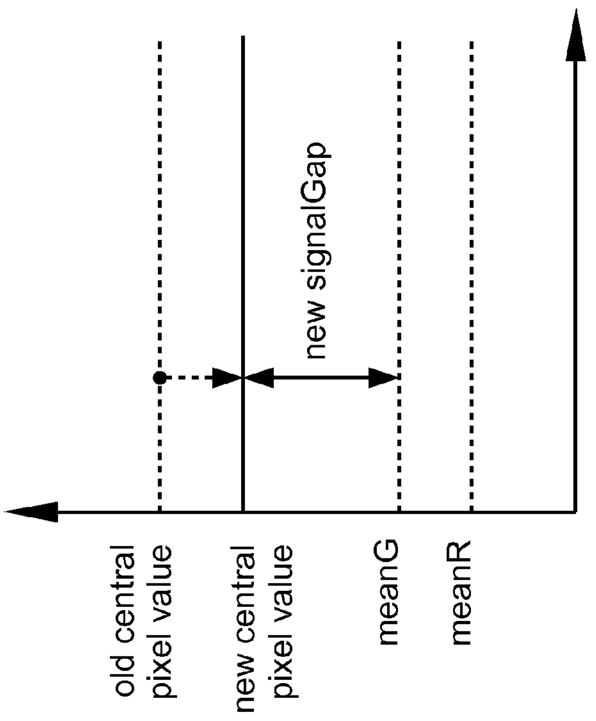

According to an embodiment, the central pixel is corrected so as to reduce signalGap. The effect of the correction is illustrated in FIG. 7B.

According to an embodiment, the correction is performed by means of a damping coefficient that depends on the digital gains. Specifically, the higher the digital gains, the lower the multiplicative damping factor. A lower damping factor corresponds to a higher damping of signalGap.

The damping factors are a (decreasing, non-negative) function of the digital gains and they may depend on the CFA channel. Green may be corrected with less strength because it carries the most significant information. In an embodiment, the damping factors are programmable. Moreover, the damping factors may be a function of the white-balance gains only. However, other digital gains, such as the antivignette gains and other possible algorithms positioned before the chroma-noise correction, may also be taken into account.

In case that, in addition to white-balance global digital gains, the local digital gains of antivignette processing (along with other possible algorithms) are taken into account, then the total digital gain associated with any given pixel at coordinates (i,j) is given by:

$$total DGain=DGain WB(ch)*DGain AV(ch,i,j)*DGain Other(\ldots)$$

An example of damping factors (dampFactorRed, dampFactorGreen, dampFactorBlue) that are selected on the basis of the relevant digital gain (gain) is illustrated in Table 1:

TABLE 1

| Gain | dampFactorRed | dampFactor Green | dampFactor Blue |
|---|---|---|---|
| 1.00 | 1.00 | 1.00 | 1.00 |
| 1.20 | 0.50 | 0.80 | 0.50 |
| 1.90 | 0.30 | 0.60 | 0.30 |
| 4.00 | 0.30 | 0.60 | 0.30 |
| 5.00 | 0.30 | 0.60 | 0.30 |

With the appropriately selected damping factor, a pre-corrected pixel value is computed as $$chromaCorrectedPix B=\max(mean G, mean R)+[dampFactorBlue*signalGap].$$

The equations for red and green central pixels are similar, i.e., $$chromaCorrectedPix R=\max(mean G, mean B)+[dampFactorRed*signalGap],\text{ and}$$

$$chromaCorrectedPix G=\max(mean B, mean R)+[dampFactorGreen*signalGap].$$

This formula allows avoiding the vast majority of false colors because, in any case, the new signalGap is not negative, i.e. the new value for the central pixel is not below max (meanG, meanR).

According to an embodiment, the above chroma correction is not always applied at 100%; in fact, only deep dark areas may retain 100% of the correction; as the amount of signal increases, the correction is faded. This may be implemented via the double-fading procedure explained below.

The first fading is driven by signalMeter. This value measures the amount of signal in the 9×9 kernel. The value of signalMeter can be expressed as:

$$signalMeter=k1*mean R+k2*mean G+k3*mean B,$$

with suitable weighting parameters k1, k2, and k3. The values of the weighting parameters may be chosen such that signalMeter represents the luminance Y in the 9×9 kernel, i.e., $$signalMeter=0.299*mean R+0.587*mean G+0.114*mean B.$$

However, this may not be a real luminance value because this quantity is calculated on raw data, even before color interpolation and color matrixing is applied. Other values for k1, k2, and k3 are possible, such as 0.333, i.e. giving equal weight to all three channels, or k1=k3=0.25 and k2=0.5, i.e. giving more weight to the green channel as compared to red and blue.

A first fading coefficient fade1 is determined as a (decreasing) function of signalMeter. The values of the first fading coefficient are in the interval [0;1]. An exemplary function is tabulated in Table 2.

TABLE 2

| signalMeter | fade1 |
|---|---|
| 30 | 1.00 |
| 50 | 0.90 |
| 70 | 0.80 |
| 100 | 0.70 |
| 150 | 0.60 |
| 200 | 0.30 |

TABLE 2-continued

| signalMeter | fade1 |
|---|---|
| 250 | 0.10 |
| 300 | 0.00 |

The thresholds appearing in Table 2 are relative to a raw image having a bit depth of 10 bits per pixel. In order to replicate the same behavior with sensors acquiring data at higher bit depths, appropriate scaling of the thresholds may be applied. For example, if the image has a bit depth of 12 bits per pixel, the above thresholds may be multiplied by four ($2^2$). It is to be noted, however, that different sensors may require different sets of threshold values. Therefore, embodiments are not limited to the particular values of Table 2. A proper tuning phase taking into account the specific characteristics of the image sensor and also a set of visual tests may yield different optimized thresholds. In general, however, it makes sense to multiply the thresholds by the appropriate scaling factor, because when increasing the bit depth, the amount of codes dedicated to the shadow areas increases.

The second fading is driven by the mean value of the current CFA channel. The reason for applying the level-2 fading is to further refine the correction depending also on how much the current channel contributes to the signalMeter value. This may be particularly critical for blue, especially if the luminance formula is used for computing signalMeter. In fact, the blue channel accounts for only about 11% of the Y value. If the luminance formula is used, it may happen that signalMeter is low even if meanB is high (because of the 0.114 weight). In this case, it may be undesirable to correct the central pixel because it is a real blue.

A second fading coefficient fade2 may be determined as a (decreasing) function of meanB. The values of the second fading coefficient are also in the interval [0;1]. An exemplary function is tabulated in Table 3.

TABLE 3

| meanB | fade2 |
|---|---|
| 30 | 1.00 |
| 50 | 0.90 |
| 70 | 0.80 |
| 100 | 0.60 |
| 150 | 0.50 |
| 200 | 0.30 |
| 250 | 0.00 |

For the red and green channels, the reasoning is similar. Two other sets of fading-2 coefficients may be determined for the meanR and meanG case; alternatively, the same set of blue fading-2 coefficients may be used. It is noted that the level-2 fading coefficients provided in Table 3 are relative to 10-bit-per-pixel image data.

As explained above, the aim of the double fading is to avoid false colors introduced in the correction step. Level-1 fading is controlled by the signalMeter, whereas level-2 fading is controlled by the value of the mean signal of the current channel. The two fadings are merged to obtain a final fading coefficient, for instance, by taking their product, $$\text{fadeTot}=\text{fade1}*\text{fade2}.$$

The final output pixel, i.e. the value to substitute for the central pixel, is then computed as a weighted sum of the original pixel value (originalPix) and the pre-corrected pixel value chromaCorrectedPix, i.e., $$\text{filterOutput}=(1-\text{fadeTot})*\text{originalPix}+\text{fadeTot}*\text{chromaCorrectedPix}.$$

Here, chromaCorrectedPix is either one of the pre-corrected values for the blue (chromaCorrectedPixB), the red (chromaCorrectedPixR), and the green channel (chromaCorrectedPixG), as explained above. It is noted that the weights, i.e., the fading coefficient fadeTot, for computing the final output pixel may also depend on the current color channel.

Figure 8:
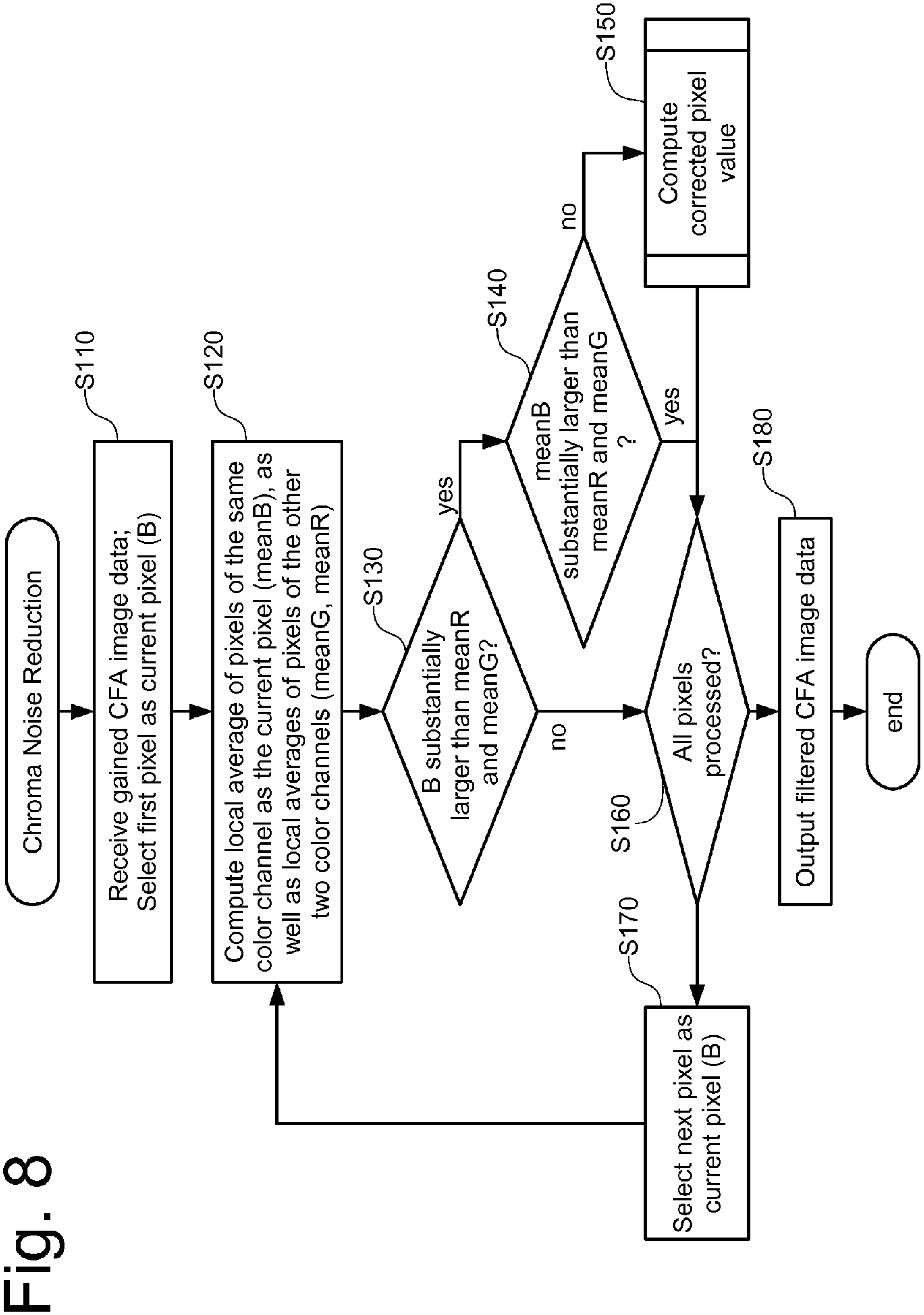
FIG. 8 is a flowchart of a method for chroma-noise reduction according to an embodiment.

FIG. 8 is a flowchart of a method for reducing chroma noise according to an embodiment.

In step S110, gained (amplified) CFA image data is received, i.e., image data to which digital gains have already been applied, and a first CFA pixel is selected to start processing with. In step S120, a local average of the pixels having the same color as the central pixel, and that are in the same kernel, is computed. Moreover, local averages of the pixels that are associated with the other two color channels, and that are in the same kernel, are computed. Computing the local averages may include computing a sum of all pixels of a certain color channel within a block (kernel) of 9×9 pixels around the current central pixel. However, other ways of computing a local average may be applied, including larger or smaller blocks and weighting pixels in accordance with their distance to the central pixel.

In step S130, it is determined whether the value of the current central pixel is substantially larger than the local mean of the other two color channels. This may be achieved, for instance, by determining whether the difference between the current pixel value and each of the two local means is larger than a (non-negative) threshold value. If this is found to be the case, it is then determined in step S140 whether the local mean of the current color channel is substantially larger than each of the local means of the other two color channels. To this end, the same threshold value or a different threshold value as in step S130 may be employed.

If it is determined that the local mean of the current color channel is not substantially larger than each of the local means of the other two color channels, a corrected pixel value is computed in step S150. The process of computing the corrected pixel value will be described in greater detail in connection with FIG. 9 below.

On the other hand, if it is determined that the local mean of the current color channel is substantially larger than each of the local means of the other two color channels, it is determined in step S160 whether all pixels have been processed. If not, the next pixel is selected in step S170 and processing is continued at step S120. Otherwise, corrected CFA image data is generated and provided as an output of this process in step S180.

Figure 9:
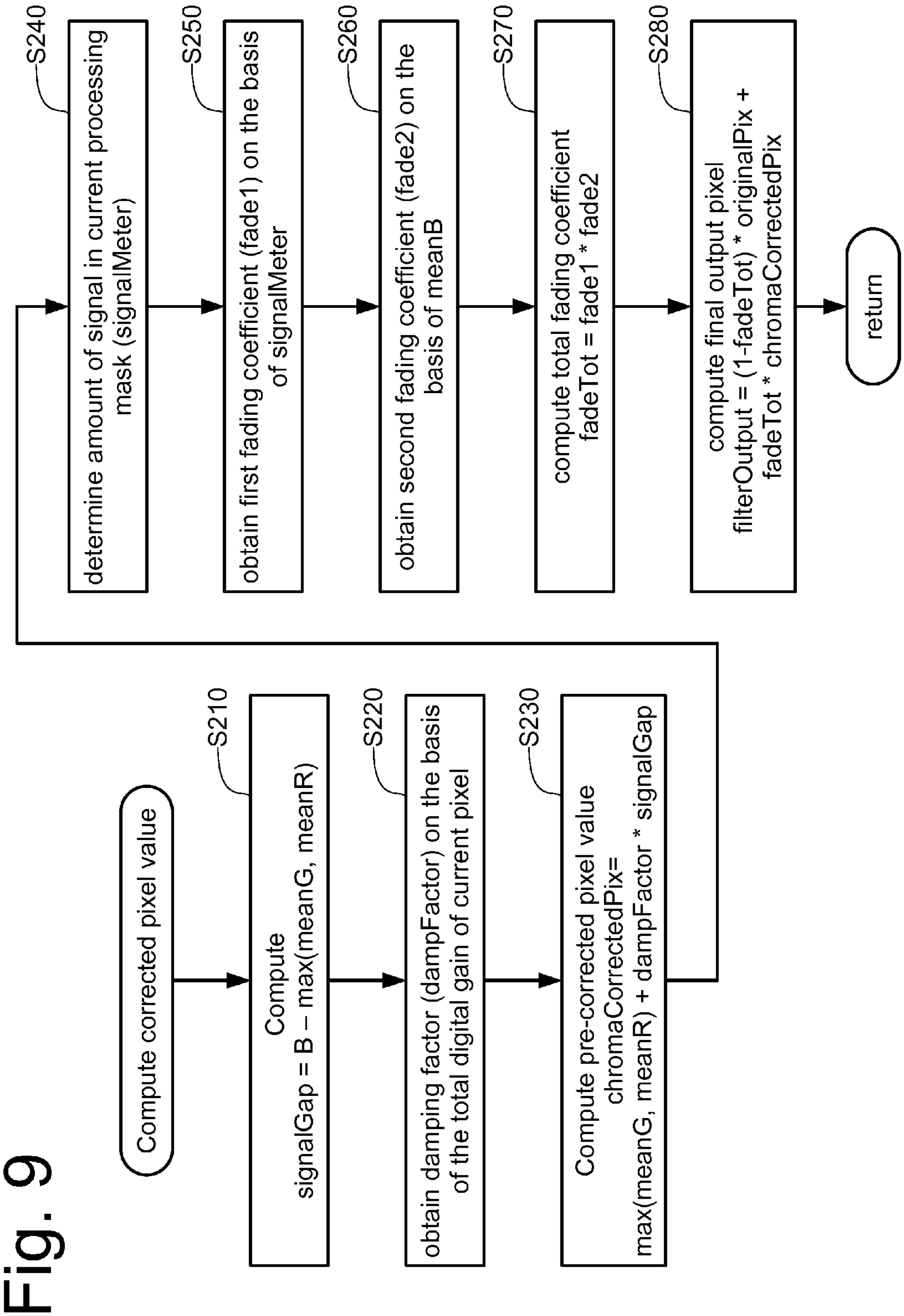
FIG. 9 is a flowchart of a method for computing corrected pixel values according to an embodiment.

FIG. 9 is a flowchart of a method for computing a corrected CFA pixel value according to an embodiment.

In step S210, parameter signalGap is computed as the difference between the original value of the current central pixel and the maximum of the local means of the other two color channels.

In step S220, a damping factor is determined on the basis of the total digital gain applied to the current central pixel. This may be achieved, for instance, by employing a look-up table similar to that illustrated in Table 1.

In step S230, a pre-corrected pixel value is computed by scaling the signalGap with the damping factor and adding the result to the maximum of the local means of the other two color channels.

In step S240, the amount of signal in the current processing mask is determined, for instance, by computing a weighted sum of the three local average values obtained in step S120.

On the basis of the determined amount of signal, a first fading coefficient is obtained. This may be achieved, for instance, by employing a look-up table similar to that illustrated in Table 2.

A second fading coefficient is then obtained on the basis of the local average of the current color channel in step S260. This may be achieved, for instance, by employing a look-up table similar to that illustrated in Table 3.

In step S270, the first and the second fading coefficients are combined into a single total fading coefficient, for instance, by computing the product of the first and the second fading coefficients.

The final output pixel is then computed in step S280 by computing a sum of the original pixel value and the pre-corrected pixel value, weighted by the total fading coefficient.

Figure 10:
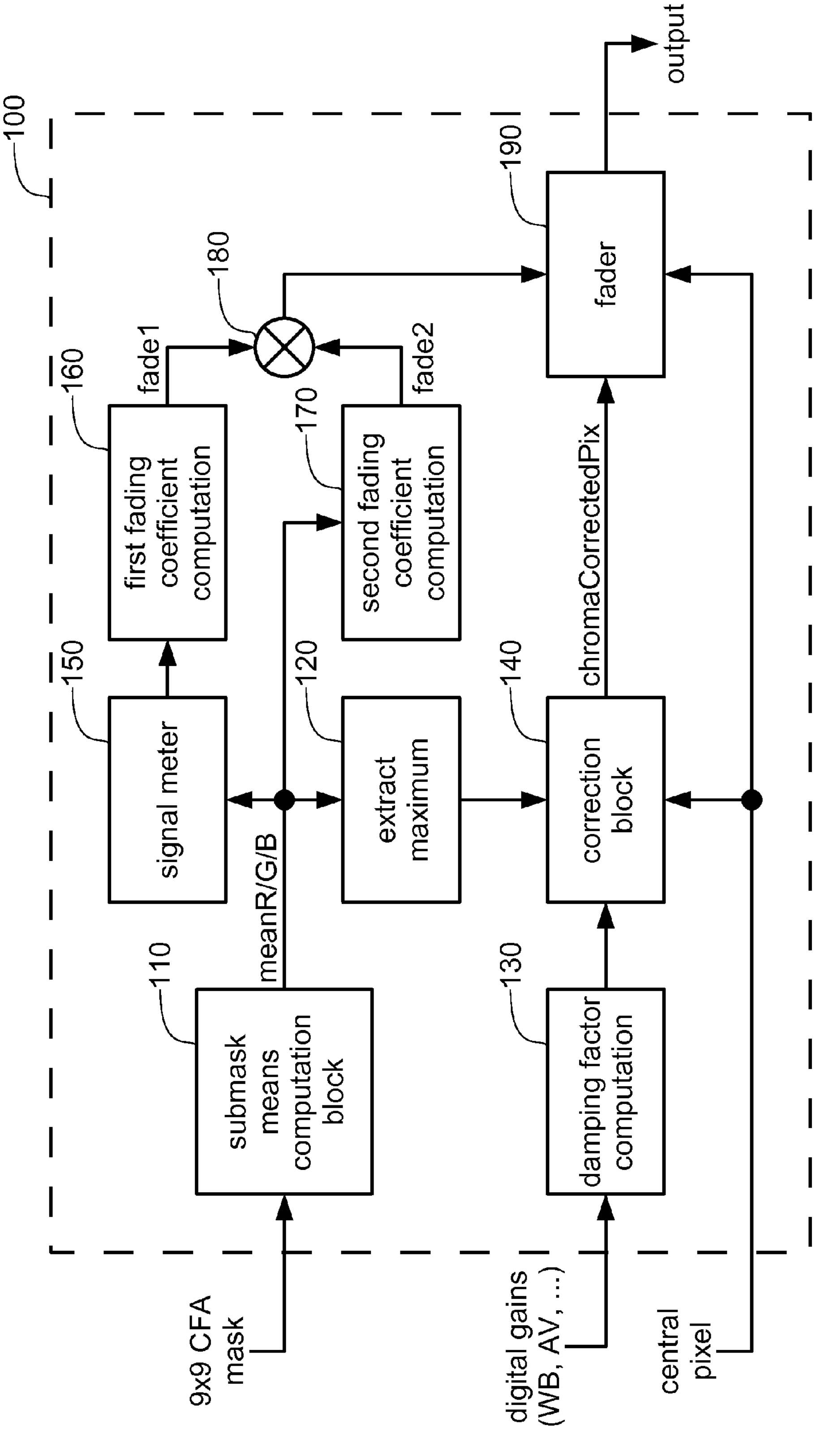
FIG. 10 is a block diagram of an image processor for chroma-noise reduction according to an embodiment.

A block diagram of an exemplary hardware implementation of an image processor 100 for reducing image chroma noise in the CFA domain is illustrated in FIG. 10. The processor 100 may execute all of the algorithms for processing the image in software, all of the algorithms in hardware, or some of the algorithms in software and others in hardware. Furthermore, hardware portions of the processor 100 may be configured by software or firmware. Moreover, the processor 100 may be coupled to another integrated circuit (e.g., a memory, image sensor) to form a system such as a camera or other imaging system. The processor 100 and other integrated circuit may be disposed on a same, or on different, integrated-circuit dies.

The image processor 100 receives, as an input, for example, a 9×9 mask of gained CFA data together with the central pixel value and digital gains for white balance and antivignette. The local average of the input data is computed, independently for each color channel, within a submask means computation block 110. The result (meanR, meanG, meanB) is then fed to a signal meter block 150 in order to compute the overall amount of signal within the current mask. This amount is employed by the first fading coefficient computation unit 160 for determining the first fading coefficient fade1, for instance, by means of a look-up table. The first fading coefficient is employed for ensuring that the correction is only applied to particularly dark image areas.

The local average of the current color channel, i.e., the color channel of the central pixel, is also fed to the second fading coefficient computation unit 170 for determining the second fading coefficient fade2, for instance, also by means of a suitable look-up table. The second fading coefficient is employed for ensuring that the correction is only applied to image areas where the current color channel is not the predominant color.

The first and the second fading coefficients are multipled by multiplier 180 and fed to fader block 190.

The digital gains, which are input to damping factor computation block 130, are employed for determining a suitable damping factor in order to correct only those areas of the image that are subject to high digital amplification. The correction is effected by correction block 140, which also receives the central pixel value and the maximum of the mean value of the other two color channels via the extract maximum block 120. The chroma-corrected pixel value computed by the correction block 140, i.e., the pre-corrected pixel value, is then fed into the fader 190 for computing the final output value by also taking the original pixel value and the total fading coefficient into account.

Although one or more embodiments have been described in connection with a Bayer filter mosaic for arranging three different color channels on a square grid of photosensors, embodiments are neither restricted to this particular arrangement nor to this particular number of color channels. Instead, other filter arrangements and a different number of color channels may be employed, such as the CYGM filter (cyan, yellow, green, magenta) and the RGBE filter (red, green, blue, emerald).

Summarizing, an embodiment relates to a method and an image processor for reducing chroma noise in digital image data. It is the particular approach of an embodiment to perform noise reduction in the color-filter-array (CFA) domain prior to demosaicing in order to prevent spreading of noise in subsequent stages of the image processing pipeline. Peaks in the CFA data are carefully attenuated in order to prevent any undesired color cast. Specifically, any correction to a certain pixel is made in accordance with the amplitude of digital gains applied, as well as with the local luminance and the contribution of the current color channel to the local luminance. In this manner, corrections are restricted to image areas that are subject to high digital amplification, that are comparatively dark, and that are not dominated by the current color channel.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method for reducing the chroma noise of pixels of digital image data, the method comprising:

for each of plurality of blocks of pixels, where each block is associated with one of a plurality of color channels of the digital image data, calculating a mean value for each of plurality of blocks of pixels; and replacing an original value of a central pixel in one of the blocks with a correction value when the original value is greater than the mean values of the other blocks and when the mean value of the block including the central pixel is not greater than any of the mean values of the other blocks.

2. The method of claim 1, wherein the digital image data includes three color channels: a red color channel, green color channel, and blue color channel.

3. The method of claim 2 further comprising replacing the original value of the central pixel with the correction value only when a digital gain, which was applied to scale the original value of the central pixel, exceeds a threshold value.

4. The method of claim 2 further comprising:

calculating a weighted sum of the mean values for each of the three color channels; and wherein the original value of the central pixel is replaced with the correction value only if the weighted sum does not exceed a threshold value.

5. The method of claim 2, wherein the original value of the central pixel is replaced with the correction value only if the mean value computed for the color channel including the central pixel does not exceed a threshold value.

6. The method of claim 2, wherein the correction value is computed so that a difference between the value of the central pixel and a maximum of the mean values computed for the other color channels is reduced.

7. The method of claim 2 further comprising:

calculating a pre-correction value of the central pixel by performing the operations of:

computing a difference between the original value of the central pixel and a maximum of the mean values of the other color channels;

scaling the difference by a non-negative damping factor that is less than or equal to one, the damping factor being a decreasing function of a digital gain by which the original value of the central pixel has been scaled; and adding the scaled difference to the maximum of the mean value of the other color channels; and calculating the correction value as a weighted sum of the pre-correction value and the original value of the central pixel.

8. The method of claim 7 further comprising:

scaling the pre-correction value with a non-negative fading coefficient that is less than or equal to one;

scaling the original value of the central pixel with one minus the fading coefficient; and adding the scaled pre-correction value and the scaled original value.

9. The method of claim 8 further comprising calculating a weighted sum of the mean values for each of the three color channels, and wherein the fading coefficient is a decreasing function of the weighted sum of the mean values.

10. A method according to claim 9, wherein the fading coefficient is a product of a decreasing function of the weighted sum of the mean values and a decreasing function of the mean value for the color channel including the central pixel.

11. The method of claim 10, wherein the weighted sum of the mean values is calculated so as to correspond to the mean luminance of the block of pixels.

12. An image processor for reducing chroma noise in digital image data, comprising:

a submask circuit configured to receive raw image data including a block of pixels, each pixel being associated with one of a plurality of different color channels, and the submask circuit configured to generate, for each color channel, a mean value of the pixels of the block of pixels that are associated with the color channel; and a correction circuit configured to replace an original value of a central pixel of the block of pixels with a correction value if the original value is larger than the mean values generated for the color channels other than the color channel including the central pixel, and if the mean value computed for the color channel including the central pixel is not larger than each of the mean values computed for the other color channels.

13. The image processor of claim 12, further comprising:

a damping factor computation circuit configured to receive a digital gain by which the central pixel has been scaled in order to compensate for at least one of vignetting and white balance, and the damping factor computation circuit configured to generate a damping factor less than or equal to one on the basis of the digital gain, the damping factor being a decreasing function of the digital gain;

a fader circuit configured to generate the correction value as a weighted sum of a pre-correction value and the original value of the central pixel; and wherein the correction circuit is configured to generate the pre-correction value by computing a difference between the original value of the central pixel and a maximum of the mean values computed for the other color channels, scaling the difference by the damping factor, and adding the scaled difference to the maximum.

14. The image processor of claim 13 further comprising:

a fading coefficient computation circuit configured to generate fading coefficient having a magnitude that is less than or equal to one, wherein the fader circuit is configured to generate the correction value by scaling the pre-correction value with the fading coefficient, scaling the original value of the central pixel with one minus the fading coefficient, and adding the scaled pre-correction value and the scaled original value.

15. The image processor of claim 14 further comprising:

a signal meter circuit configured to generate a weighted sum of the mean values generated for each of the three color channels; and wherein the fading coefficient computation circuit is configured to generate the fading coefficient as a decreasing function of the weighted sum of the mean values.

16. The image processor of claim 15, wherein the fading coefficient computation circuit is configured to generate the fading coefficient as a product of a decreasing function of the weighted sum of the mean values and a decreasing function of the mean value computed for the color channel of the central pixel.

17. The image processor of claim 16, wherein the signal meter circuit is configured to generate the weighted sum of the mean values so as to correspond to the mean luminance of the block of pixels.

* * * * *

UNITED STATES PATENT AND TRADEMARK OFFICE

CERTIFICATE OF CORRECTION

PATENT NO. : 9,129,393 B2
APPLICATION NO. : 13/421799
DATED : September 8, 2015
INVENTOR(S) : Angelo Bosco et al.

It is certified that error appears in the above-identified patent and that said Letters Patent is hereby corrected as shown below:

Title Page Item (73):
"STMircoelectronics S.r.l., Agrate Brianza (IT)" should read, --STMicroelectronics S.r.l., Agrate Brianza (IT)--.

Signed and Sealed this
Twenty-third Day of February, 2016

Michelle K. Lee
*Director of the United States Patent and Trademark Office*

UNITED STATES PATENT AND TRADEMARK OFFICE

CERTIFICATE OF CORRECTION

| | | |
|---|---|---|
| PATENT NO. | : 9,129,393 B2 |  |
| APPLICATION NO. | : 13/421799 | |
| DATED | : September 8, 2015 | |
| INVENTOR(S) | : Angelo Bosco | |

It is certified that error appears in the above-identified patent and that said Letters Patent is hereby corrected as shown below:

Title Page Item (73):
"STMircoelectronics S.r.l., Agrate Brianza (IT)" should read, --STMicroelectronics S.r.l., Agrate Brianza (IT)--.
(as corrected to read in the Certificate of Correction issued February 23, 2016) is deleted and patent is returned to its original state with the applicant & assignee name in patent to read
-- (73) Assignee: STMircoelectronics S.r.l., Agrate
Brianza (IT) --

Signed and Sealed this
Twenty-first Day of June, 2016

Michelle K. Lee
*Director of the United States Patent and Trademark Office*